US012674015B2

(12) United States Patent
Chen

(10) Patent No.: US 12,674,015 B2
(45) Date of Patent: Jul. 7, 2026

(54) DUAL CURE 3D PRINTING RESINS

(71) Applicant: Stratasys, Inc., Minnetonka, MN (US)

(72) Inventor: Liang Chen, Sewickley, PA (US)

(73) Assignee: Stratasys, Inc., Minnetonka, MN (US)

( * ) Notice: Subject to any disclaimer, the term of this patent is extended or adjusted under 35 U.S.C. 154(b) by 0 days.

(21) Appl. No.: 18/574,354

(22) PCT Filed: Jun. 21, 2022

(86) PCT No.: PCT/US2022/034317
§ 371 (c)(1),
(2) Date: Dec. 27, 2023

(87) PCT Pub. No.: WO2023/278201
PCT Pub. Date: Jan. 5, 2023

(65) Prior Publication Data
US 2024/0279508 A1      Aug. 22, 2024

(51) Int. Cl.
| | |
|---|---|
| *B33Y 70/00* | (2020.01) |
| *B29C 64/124* | (2017.01) |
| *B33Y 10/00* | (2015.01) |
| *C08G 18/10* | (2006.01) |
| *C08G 18/32* | (2006.01) |
| *C08G 18/38* | (2006.01) |
| *C08G 18/44* | (2006.01) |
| *C08G 18/48* | (2006.01) |
| *C08G 18/67* | (2006.01) |
| *C09D 175/14* | (2006.01) |
| *B29K 33/00* | (2006.01) |
| *B29K 75/00* | (2006.01) |

(52) U.S. Cl.
CPC ............ *C08G 18/10* (2013.01); *B29C 64/124* (2017.08); *B33Y 10/00* (2014.12); *B33Y 70/00* (2014.12); *C08G 18/3206* (2013.01); *C08G 18/3218* (2013.01); *C08G 18/3876* (2013.01); *C08G 18/44* (2013.01); *C08G 18/4825* (2013.01); *C08G 18/672* (2013.01); *C09D 175/14* (2013.01); *B29K 2033/08* (2013.01); *B29K 2075/00* (2013.01)

(58) Field of Classification Search
None
See application file for complete search history.

(56) References Cited

U.S. PATENT DOCUMENTS

| | | | |
|---|---|---|---|
| 4,642,126 A | 2/1987 | Zador et al. | |
| 4,652,274 A | 3/1987 | Boettcher et al. | |
| 4,788,083 A | 11/1988 | Dammann et al. | |
| 8,329,776 B2 | 12/2012 | Hecht et al. | |
| 9,295,617 B2 | 3/2016 | Eckert et al. | |
| 9,453,142 B2 | 9/2016 | Rolland et al. | |
| 10,316,213 B1 | 6/2019 | Arndt et al. | |
| 10,793,745 B2 | 10/2020 | Arndt et al. | |
| 2010/0056722 A1* | 3/2010 | Thomas | C08L 67/02 |
| | | | 525/123 |
| 2011/0053116 A1 | 3/2011 | Hecht et al. | |
| 2012/0065336 A1 | 3/2012 | Mizori et al. | |
| 2012/0128313 A1* | 5/2012 | Wu | C03C 25/326 |
| | | | 522/64 |
| 2017/0120515 A1 | 5/2017 | Rolland et al. | |
| 2017/0260405 A1* | 9/2017 | Kumai | C09D 11/102 |
| 2020/0291260 A1 | 9/2020 | Loveday et al. | |
| 2021/0054125 A1 | 2/2021 | Achten et al. | |
| 2022/0411563 A1 | 12/2022 | Chen | |

FOREIGN PATENT DOCUMENTS

| | | | |
|---|---|---|---|
| CN | 112 521 573 A | * | 3/2021 |
| EP | 2008636 A1 | | 12/2008 |

OTHER PUBLICATIONS

International Search Report and Written Opinion received for PCT Patent Application No. PCT/US2022/034317, mailed on Sep. 19, 2022, 8 pages.
Konuray, Osman et al, Polymers 2018, 10, 178.
Product Data Sheet, Omnirad 1173 {formerly Igacure 1173) Photoinitiator, IGM Resins B.V., Jun. 9, 2016.
Velankar, Sachin et al, J. Appl. Polym. Sci. vol. 62, 1361-1376 (1996).

* cited by examiner

*Primary Examiner* — Mohammad M Ameen
(74) *Attorney, Agent, or Firm* — Faegre Drinker Biddle & Reath LLP

(57) ABSTRACT

Provided is a composition comprising: A) an aliphatic polyurethane which comprises a reaction product of a first aliphatic polyisocyanate, a first polyol, and a thiol, optionally in the presence of a catalyst, and B) a urethane (meth) acrylate prepolymer, optionally a reactive diluent, and a photoinitiator, wherein the urethane (meth)acrylate prepolymer comprises a reaction product of a second aliphatic polyisocyanate, a second polyol and an acrylate, wherein the reactive diluent comprises a (meth)acrylate monomer, wherein the first aliphatic polyisocyanate and second aliphatic polyisocyanate may be identical or different, and wherein the first polyol and the second polyol may be identical or different. Also provided is a process comprising combining: A) a polyurethane which comprises a reaction product of a first aliphatic polyisocyanate, a first polyol, and a thiol, optionally in the presence of a catalyst, and B) a urethane (meth)acrylate prepolymer, a reactive diluent, and a photoinitiator, wherein the urethane (meth)acrylate prepolymer comprises a reaction product of a second aliphatic polyisocyanate, a second polyol and an acrylate, wherein the reactive diluent comprises a (meth)acrylate monomer, wherein the first aliphatic polyisocyanate and second aliphatic polyisocyanate may be identical or different, and wherein the first polyol and the second polyol may be identical or different. The compositions of the invention may find use in 3D printing applications.

8 Claims, No Drawings

DUAL CURE 3D PRINTING RESINS

CROSS-REFERENCE TO RELATED APPLICATIONS

This application is a National stage application (under 35 U.S.C. § 371) of PCT/US2022/034317, filed Jun. 21, 2022, which claims benefit of U.S. application Ser. No. 17/359, 926, filed Jun. 28, 2021, both of which are incorporated herein by reference in their entirety.

FIELD OF THE INVENTION

The present invention relates in general to additive manufacturing, and more specifically to UV-cured urethane (meth)acrylate compositions for use in three-dimensional (3D)-printing processes.

BACKGROUND OF THE INVENTION

Photo-curable resins based on multifunctional (meth) acrylate monomers and urethane (meth)acrylate prepolymers are commonly applied as thin films (e.g. protective coatings, printing inks, etc.) and in recent years have also been used for the fabrication of bulk objects such as 3D-printed parts. Although rapid curing and good spatial resolution are advantages to these systems, they may also experience brittleness and poor impact resistance due to inhomogeneous polymer architecture and high crosslink density. In many demanding applications, it is highly desirable to increase polymer toughness, for example, a UV cured resin having both high tensile strength and elongation at break.

In the past, researchers have tried to apply strategies for toughening epoxy resins to photopolymer networks to achieve the desired improved toughness. Strategies developed to reduce brittleness include working with new chemistries (e.g. thiol-ene chemistry) and new urethane (meth) acrylate prepolymers, which intrinsically give tougher polymers, particulate additives, and alternate forms of polymerization and polymer architecture (e.g. interpenetrating networks). All these strategies have advantages and yet application specific rigors must also be considered before and during formulation development. Dual-cure systems (e.g. UV+thermal) are of particular interest because they enable the enhancement of UV-cured resin properties by an independent mechanism (a new polymer phase). The final cured resin can have a phase separated structure such as an interpenetrating network. The UV-cured resin properties can be greatly improved with a second tough polymer phase.

To reduce or eliminate problems, therefore, a need continues to exist in the art for a simple approach to enhance the polymer toughness in 3D printing resins without sacrificing high tensile strength and elongation at break.

SUMMARY OF THE INVENTION

Accordingly, the present invention provides a novel method of modifying UV cured resins using an orthogonal cure chemistry (i.e. thermal cure) based on latent reactions of aliphatic polyurethane compositions in which the UV curable composition (urethane (meth)acrylate and (meth) acrylate monomers) is first reacted via a UV-curing process. In the subsequent thermal curing step, a second polyurethane is produced independent of the first urethane acrylate phase. Ideally, the final cured resin composition contains both crosslinked-urethane (meth)acrylate resin and thermoplastic or thermoset polyurethane. Polyurethanes display a wide range of mechanical properties from flexible elastomers to rigid thermosets.

DETAILED DESCRIPTION OF THE INVENTION

The present invention will now be described for purposes of illustration and not limitation. Except in the operating examples, or where otherwise indicated, all numbers expressing quantities, percentages, and so forth in the specification are to be understood as being modified in all instances by the term "about."

Any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a), and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "various non-limiting embodiments," "certain embodiments," or the like, means that a particular feature or characteristic may be included in an embodiment. Thus, use of the phrase "in various non-limiting embodiments," "in certain embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various or certain embodiments may be combined, in whole or in part, with the features or characteristics of one or more other embodiments without limitation. Such modifications and variations are intended to be included within the scope of the present specification.

The grammatical articles "a", "an", and "the", as used herein, are intended to include "at least one" or "one or more", unless otherwise indicated, even if "at least one" or "one or more" is expressly used in certain instances. Thus, these articles are used in this specification to refer to one or more than one (i.e., to "at least one") of the grammatical objects of the article. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

In the literature, delayed cure polyurethane reactions are achieved by using either blocked isocyanate (*J. Appl. Polym. Sci.*, 1996, 62, 1361) or encapsulation of one reactive ingredient (U.S. Pat. No. 10,316,213). Although blocked isocyanates or encapsulated isocyanates can achieve a superior pot-life, both require higher temperatures to free the reactive isocyanate groups.

Examples of delayed polyurethane reaction can be found in U.S. Pat. No. 4,788,083. The instant invention successfully incorporates this approach in a UV resin system. Because there is residual polyurethane catalyst in the synthesized urethane (meth)acrylate prepolymer, adding thiol additives or acids is very effective to complex with the metal catalyst, thus significantly slowing down the polyurethane reaction. This significantly extends the formulation pot life from a few minutes to several hours. The delayed cure polyurethane chemistry has sufficient pot life (e.g. >8 hours at room temperature) to enable the liquid resin formulation and printing process. One significant advantage of such delayed cure chemistry is much faster polyurethane reaction by thermal activation. The thermal cure can take place at lower temperature and/or in less time compared with the current approaches of blocked isocyanates or encapsulation. In addition, this approach allows incorporation of a wide range of aliphatic polyurethane compositions and is not limited by the design of new prepolymer structures or the efficiency of active encapsulation.

Such a novel composition can be used in 3D-printing processes, where the UV cure is performed first to form a specific part, followed by thermal cure (e.g. 120 C° For 30 min.) to complete the polyurethane reaction. The formation of the polyurethane phase can greatly improve the ductility and toughness of UV-cured urethane (meth)acrylate.

Additionally, such novel compositions can be used in different printing processes, such as inkjet printing, where thermal cure is applied first on the composition to build a 3D object, followed by UV cure during which the final properties are set. This approach can eliminate the problems of mixing a two-component polyurethane formulation using a complicated mixing head in such printing processes.

Without wishing to be bound to any particular theory, the present inventor speculates that a second polyurethane phase serves as an alternative means to tune some specific physical properties like modulus or elongation at break of cured resins. Such dual cure systems help enhance the performance of UV-cured resins for 3D-printing applications.

In a first aspect, the present invention is directed to a composition comprising: A) an aliphatic polyurethane which comprises a reaction product of a first aliphatic polyisocyanate, a first polyol, and a thiol, optionally in the presence of a catalyst, and B) a urethane (meth)acrylate prepolymer, optionally a reactive diluent, and a photoinitiator, wherein the urethane (meth)acrylate prepolymer comprises a reaction product of a second aliphatic polyisocyanate, a second polyol and an acrylate, wherein the reactive diluent comprises a (meth)acrylate monomer, wherein the first aliphatic polyisocyanate and second aliphatic polyisocyanate may be identical or different, and wherein the first polyol and the second polyol may be identical or different.

In a second aspect, the present invention is directed to a process comprising combining: A) a polyurethane which comprises a reaction product of a first aliphatic polyisocyanate, a first polyol, and a thiol, optionally in the presence of a catalyst, and B) a urethane (meth)acrylate prepolymer, a reactive diluent, and a photoinitiator, wherein the urethane (meth)acrylate prepolymer comprises a reaction product of a second aliphatic polyisocyanate, a second polyol and an acrylate, wherein the reactive diluent comprises a (meth)acrylate monomer, wherein the first aliphatic polyisocyanate and second aliphatic polyisocyanate may be identical or different, and wherein the first polyol and the second polyol may be identical or different.

In a third aspect, the present invention is directed to a process of producing a three-dimensional object, the process comprising the steps of: A) depositing the composition according to either of the previous two paragraphs atop a carrier to obtain a layer of a construction material joined to the carrier which corresponds to a first selected cross section of the precursor; B) depositing additional composition atop a previously applied layer of the construction material to obtain a further layer of the construction material which corresponds to a further selected cross section of the precursor and which is joined to the previously applied layer; C) repeating step B) until the precursor is formed, wherein the depositing of the composition at least in step B) further comprises introducing energy to a selected region of the composition corresponding to the respectively selected cross section of the object.

The compositions of the present disclosure include at least one urethane. As used herein, a "urethane" refers to a compound including one or more carbamate functionalities in the backbone of the compound. In certain embodiments, the carbamate functionality is as shown below:

$$-N(H)-C(O)O-$$

Urethanes are prepared by the reaction of an isocyanate with an alcohol to form carbamate linkages. Moreover, the term "polyurethane" has been used more generically to refer to the reaction products of polyisocyanates with any poly-active hydrogen compound including polyfunctional alcohols, and amines.

The urethane provides both toughness (e.g., at least a minimum tensile strength and/or modulus) and flexibility (e.g., at least a minimum elongation at break) to the final article. In various embodiments, in addition to the urethane functionality, the urethane further comprises one or more functional groups selected from hydroxyl groups, carboxyl groups, amino groups, and siloxane groups. These functional groups can be reactive with other components of the composition during polymerization. The urethane comprises a urethane (meth)acrylate, and a linking group selected from alkyl, polyalkylene, polyalkylene oxide, aryl, polycarbonate, polyester, polyamide, and combinations thereof. As used herein, "linking group" refers to a functional group that connects two or more urethane groups. The linking group may be divalent, trivalent, or tetravalent. the first urethane composition comprises 10-50 wt. % of the total composition.

Urethane (meth)acrylates are known to those skilled in the art and may be prepared in a known manner by, for example, reacting a hydroxyl-terminated polyurethane with acrylic acid, methacrylic acid, or isocyanatoethyl methacrylate, or by reacting an isocyanate-terminated prepolymer with hydroxyalkyl (meth)acrylates to give the urethane (meth) acrylate. Suitable processes are disclosed, e.g., in U.S. Pat. Nos. 8,329,776 and 9,295,617. Suitable urethane methacrylates can include aliphatic urethane methacrylates, aliphatic polyester urethane methacrylates, and aliphatic polyester triurethane acrylates.

In certain embodiments, the urethane (meth)acrylate comprises at least one (meth)acrylate component having a urethane moiety, which may help to improve physical properties of the cured composition such as flexural strength and/or elongation at break. Such a urethane may have the following features: a) at least 2 to 4 (meth)acrylate moieties; b) a number average molecular weight ($M_n$) of from 1,000 to 5,000 g/mol; c) a $C_1$ to $C_{20}$ linear or branched alkyl moiety to which the (meth)acrylate moieties are attached through urethane moieties; d) a viscosity of from 0.1 to 100 Pas at 23° C. A combination of these features may sometimes be preferred.

Urethane (meth)acrylates may be obtained by a number of processes known to those skilled in the art. The urethane (meth)acrylates may be obtained by reacting an NCO-terminated compound with a suitable monofunctional (meth)acrylate monomer, such as hydroxyethyl acrylate, hydroxyethyl methacrylate, hydroxypropylmethacrylate. For example, a polyisocyanate and a polyol may be reacted to form an isocyanate-terminated urethane prepolymer that is subsequently reacted with a (meth)acrylate such as 2-hydroxy ethyl(meth)acrylate. Such reactions may be conducted at room temperature or higher temperature, optionally in the presence of catalysts, such as tin catalysts and tertiary amines. The polyol can be an acrylic polyol, a polyester polyol, a polyether polyol, a polyurethane polyol, or a polycarbonate polyol. Suitable catalysts include those known from polyurethane chemistry including organotin compounds such as dibutyltin dilaurate or other metal catalysts containing metals such as bismuth and zinc. Suitable metal catalysts include, but are not limited to, stannous acetate, stannic oxide, stannous octoate, dibutyltin dioctoate, tin mercaptides, stannous citrate, stannous oxylate, stannous chloride, stannic chloride, tetra-phenyl tin, tetra butyl tin, tri-n-butyl tin acetate, dialkyl tin dicarboxylates, dimethyl tin dichloride, and mixtures thereof; and the bismuth catalyst is selected from the group consisting of bismuth tricarboxylates, bismuth nitrate, bismuth halides, bismuth sulfide, basic bismuth dicarboxylates, and mixtures thereof. The metal catalyst is included in the inventive compositions at levels of <500 ppm, preferably <100 ppm.

Suitable aliphatic diisocyanates, prepolymers, and polyisocyanates for use in the present invention are clear and colorless and have a viscosity at 25° C. of less than 5000 centipoises. Examples of such aliphatic polyisocyanates include those represented by the formula, $$Q(NCO)_n$$

wherein n is a number from 2-5, in various embodiments from 2-3, and Q is an aliphatic hydrocarbon group containing 2-12, in certain embodiments from 4-6, carbon atoms or a cycloaliphatic hydrocarbon group containing 4-6, in selected embodiments from 5-6, carbon atoms.

Examples of aliphatic diisocyanates which are suitable for use in the present invention include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and 1,4-diisocyanate, 1-isocyanato-2-isocyanato-methyl cyclopentane, 5-isocyanato-1-(isocyanatomethyl)-1,3,3-trimethylcyclohexane (IPDI), bis-(4-isocyanatocyclohexyl)methane, 1,3- and 1,4-bis(isocyanatomethyl)-cyclohexane, bis-(4-isocyanato-3-methyl-cyclohexyl)-methane, 1-isocyanato-1-methyl-4(3)-isocyanato-methyl cyclohexane, dicyclohexylmethane-4,4-diisocyanate ($H_{12}MDI$), pentane diisocyanate (PDI), and, isomers of any of these; or combinations of any of these. Mixtures of diisocyanates may also be used. Preferred diisocyanates include 1,6-hexamethylene diisocyanate, isophorone diisocyanate, and bis(4-isocyanatocyclohexyl)-methane because they are readily available and yield relatively low viscosity polyisocyanate formulations.

The aliphatic isocyanate can comprise at least one of a polyisocyanate comprising a biuret group, such as the biuret adduct of hexamethylene diisocyanate (HDI) available from Covestro AG under the trade designation DESMODUR N-100, a polyisocyanate containing an isocyanurate group, such as that available from Covestro AG under trade designation DESMODUR N-3300, a polyisocyanate such as that available from Covestro AG under the tradename DESMODUR N-3600, which has a viscosity of 800-1400 mPa·s at 25° C., and a polyisocyanate containing at least one of an iminooxadiazine dione group, a urethane group, a uretdione group, a carbodiimide group, and an allophanate group.

Aliphatic isocyanate-terminated prepolymers may also be employed in the present invention. as those skilled in the art are aware, prepolymers may be prepared by reacting an excess of organic polyisocyanate or mixtures thereof with a minor amount of an active hydrogen-containing compound as determined by the well-known Zerewitinoff test, as described by Kohler in "Journal of the American Chemical Society," 49, 3181(1927). These compounds and their methods of preparation are well known to those skilled in the art. The use of any one specific active hydrogen compound is not critical; any such compound can be employed in the practice of the present invention. In certain embodiments, the polyisocyanate comprises blend based on a hexamethylene diisocyanate trimer and a dicyclohexylmethane-4,4-diisocyanate prepolymer.

The urethane meth(acrylate) prepolymer is included in the compositions in an amount of 40 to 70 wt. %, based on the total weight of the composition.

The compositions of the present disclosure include a monofunctional reactive diluent. A "reactive diluent," as used herein, means a component that contains at least one free radically reactive group (e.g., an ethylenically-unsaturated group) that can co-react with the at least one urethane (e.g., is capable of undergoing addition polymerization). The reactive diluent has a smaller molecular weight than the urethane, often less than 400 grams per mole, and does not contain any urethane functional groups (e.g., is free of any urethane functional groups).

In select embodiments, the monofunctional reactive diluent comprises a (meth)acrylate, an alkyl (meth)acrylate, a phenoxy (meth)acrylate, a hydroxy alkyl (meth)acrylate, or a combination thereof. In preferred embodiments, the monofunctional reactive diluent comprises phenoxy ethyl methacrylate, such as in an amount of 20 to 80 wt. % of the total amount of the total monofunctional reactive diluent content.

Suitable free-radically polymerizable monofunctional diluents include phenoxy ethyl(meth)acrylate, phenoxy-2-methylethyl(meth)acrylate, phenoxyethoxyethyl(meth)acrylate, 3-hydroxy-2-hydroxypropyl(meth)acrylate, benzyl (meth)acrylate, phenylthio ethyl acrylate, 2-naphthylthio ethyl acrylate, 1-naphthylthio ethyl acrylate, 2,4,6-tribromophenoxy ethyl acrylate, 2,4-dibromophenoxy ethyl acrylate, 2-bromophenoxy ethyl acrylate, 1-naphthyloxy ethyl acrylate, 2-naphthyloxy ethyl acrylate, phenoxy 2-methylethyl acrylate, phenoxyethoxyethyl acrylate, 3-phenoxy-2-hydroxy propyl acrylate, 2,4-dibromo-6-sec-butylphenyl acrylate, 2,4-dibromo-6-isopropylphenyl (meth)acrylate, benzyl (meth)acrylate, phenyl (meth)acrylate, tetrahydrofurfuryl (meth)acrylate, alkoxylated tetrahydrofurfuryl acrylate, ethoxylated nonyl phenol (meth)acrylate, alkoxylated lauryl (meth)acrylate, alkoxylated phenol (meth)acrylate, stearyl (meth)acrylate, tetrahydrofurfuryl (meth)acrylate, lauryl (meth)acrylate, isodecyl (meth)acrylate, isooctyl (meth)acrylate, octadecyl (meth)acrylate, tridecyl (meth) acrylate, ethoxylated (4) nonyl phenol (meth)acrylate, caprolactone (meth)acrylate, cyclic trimethylolpropane formal (meth)acrylate, 3,3,5-trimethylcyclohexyl (meth)acrylate, dicyclopentadienyl (meth)acrylate, isobutyl (meth) acrylate, n-butyl (meth)acrylate, ethyl hexyl (meth)acrylate, isobornyl (meth)acrylate, and 2,4,6-tribromophenyl (meth) acrylate.

Certain embodiments of the invention optionally include a multifunction reactive diluent. Suitable free-radically polymerizable multifunctional reactive diluents include di-, tri-, or other poly-acrylates and methacrylates such as glycerol diacrylate, ethoxylated bisphenol A dimethacrylate (D-zethacrylate), tetraethylene glycol dimethacrylate (TEGDMA), polyethyleneglycol dimethacrylate (PEGDMA), glycerol triacrylate, ethyleneglycol diacrylate, diethyleneglycol diacrylate, triethyleneglycol dimethacrylate, 1,3-propanediol diacrylate, 1,3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p-ethoxyphenyldimethylmethane, bis[1-(3-acryloxy-2-hydroxy)]-p-propoxyphenyldimethylmethane, and trishydroxyethyl-isocyanurate trimethacrylate; bis-acrylates of polyesters (e.g., methacrylate-terminated polyesters); the bis-acrylates and bis-methacrylates of polyethylene glycols of molecular weight 200-500, copolymerizable mixtures of acrylated monomers such as those in U.S. Pat. No. 4,652,274, acrylated oligomers such as those of U.S. Pat. No. 4,642,126; and polyfunctional (meth)acrylates comprising urea or amide groups, such as those of EP 2008636.

The reactive diluent can comprise one or more poly(meth) acrylates, for example, di-, tri-, tetra- or pentafunctional monomeric or oligomeric aliphatic, cycloaliphatic, or aromatic acrylates or methacrylates.

Examples of suitable aliphatic poly(meth)acrylates having more than two (meth)acrylate groups in their molecules are the triacrylates and trimethacrylates of hexane-2,4,6-triol; glycerol or 1,1,1-trimethylolpropane; ethoxylated or propoxylated glycerol or 1,1,1-trimethylolpropane; and the hydroxyl-containing tri(meth)acrylates which are obtained by reacting triepoxide compounds, for example the triglycidyl ethers of said triols, with (meth)acrylic acid. It is also possible to use, for example, pentaerythritol tetraacrylate, bistrimethylolpropane tetraacrylate, pentaerythritol mono-hydroxytriacrylate or -methacrylate, or dipentaerythritol monohydroxypentaacrylate or --methacrylate.

Another suitable class of free radical polymerizable compounds includes aromatic di(meth)acrylate compounds and trifunctional or higher functionality (meth)acrylate compound. Trifunctional or higher functionality meth(acrylates) can be tri-, tetra- or pentafunctional monomeric or oligomeric aliphatic, cycloaliphatic, or aromatic acrylates or methacrylates.

Examples of suitable aliphatic tri-, tetra- and pentafunctional (meth)acrylates are the triacrylates and trimethacrylates of hexane-2,4,6-triol; glycerol or 1,1,1-trimethylolpropane; ethoxylated or propoxylated glycerol or 1,1,1-trimethylolpropane; and the hydroxyl-containing tri(meth) acrylates which are obtained by reacting triepoxide compounds, for example the triglycidyl ethers of said triols, with (meth)acrylic acid. It is also possible to use, for example, pentaerythritol tetraacrylate, bistrimethylolpropane tetraacrylate, pentaerythritol monohydroxytriacrylate or -methacrylate, or dipentaerythritol monohydroxypentaacrylate or --methacrylate. In various embodiments, tri (meth)acrylates comprise 1,1-trimethylolpropane triacrylate or methacrylate, ethoxylated or propoxylated 1,1,1-trimethylolpropanetriacrylate or methacrylate, ethoxylated or propoxylated glycerol triacrylate, pentaerythritol monohydroxy triacrylate or methacrylate, or tris(2-hydroxy ethyl) isocyanurate triacrylate. Further examples of suitable aromatic tri(meth)acrylates are the reaction products of triglycidyl ethers of trihydroxy benzene and phenol or cresol novolaks containing three hydroxyl groups, with (meth) acrylic acid.

In some cases, a reactive diluent comprises diacrylate and/or dimethacrylate esters of aliphatic, cycloaliphatic or aromatic diols, including 1,3- or 1,4-butanediol, neopentyl glycol, 1,6-hexanediol, dodecane diol, diethylene glycol, triethylene glycol, tetraethylene glycol, polyethylene glycol, tripropylene glycol, ethoxylated or propoxylated neopentyl glycol, 1,4-dihydroxymethylcyclohexane, 2,2-bis(4-hydroxycyclohexyl)propane or bis(4-hydroxycyclohexyl) methane, hydroquinone, 4,4'-dihydroxybiphenyl, bisphenol A, bisphenol F, bisphenol S, ethoxylated or propoxylated bisphenol A, ethoxylated or propoxylated bisphenol F or ethoxylated or propoxylated bisphenol S. In some cases, a reactive diluent described herein comprises one or more higher functional acrylates or methacrylates such as dipentaerythritol monohydroxy pentaacrylate or bis(trimethylolpropane)tetraacrylate.

In selected embodiments, the reactive diluent comprises a molecular weight of 100 g/mol to 400 g/mol. The reactive diluent is included in the composition in an amount of 25 to 70 wt. %, wherein the wt. % in all instances is based on total weight of the composition.

The composition further comprises one or more photoinitiators. Suitable photoinitiators include, but are not limited to the various IRGACURE and DAROCUR from BASF, such as 1-hydroxycyclohexyl phenyl ketone (IRGACURE 184), 2,2-dimethoxy-1,2-diphenylethan-1-one (IRGACURE 651), bis(2,4,6 trimethylbenzoyl)phenylphosphineoxide (IRGACURE 819), 1-[4-(2-hydroxyethoxy)phenyl]-2-hydroxy-2-methyl-1-propane-1-one (IRGACURE 2959), 2-benzyl-2-dimethylamino-1-(4-morpholinophenyl)butanone (IRGACURE 369), 2-methyl-1-[4-(methylthio)phenyl]-2-morpholinopropan-1-one (IRGACURE 907), oligo [2-hydroxy-2-methyl-1[4-(1-methylvinyl)phenyl] propanone] ESACURE ONE (Lamberti S. p. A., Gallarate, Italy), 2-hydroxy-2-methyl-1-phenyl propan-1-one (DAROCUR 1173), 2,4,6-trimethylbenzoyldiphenylphosphine oxide (IRGACURE TPO), and 2,4,6-trimethylbenzoylphenyl phosphinate (IRGACURE TPO-L). Additional suitable photoinitiators include, benzyl dimethyl ketal, 2-methyl-2-hydroxypropiophenone, benzoin methyl ether, benzoin isopropyl ether, anisoin methyl ether, aromatic sulfonyl chlorides, photoactive oximes, and combinations thereof. The photoinitiator is included in an amount of 0.1-5% by weight, based on the total weight of the composition.

The compositions of the invention contain a thiol to slow the polyurethane producing reaction of the polyisocyanate and polyol. Such thiols include, but are not limited to, trimethylol propane tri-(3-mercapto propionate), pentaerythritol tetra-(3-mercapto propionate), glycol di-(3-mercapto propionate), glycol dimercapto acetate, trimethylol propane trithioglycolate, mercapto diethyl ether, ethane dithiol, thiolactic acid, mercapto propionic acid and esters thereof, thiophenol, thio acetic acid, 2-mercapto ethanol, 1,4-butanedithiol, 2-3-dimercapto propanol, toluene-3,4-dithiol, α,α'-dimercapto-p-xylene, thiosalicylic acid, mercapto acetic acid, dodecane dithiol, didodecane dithiol, di-thio phenol, di-p-chlorothiophenol, dimercapto benzothiazole, 3,4-dimercapto toluene, allyl mercaptan, benzyl mercaptan, 1,6-hexane dithiol, 1-octane thiol, p-thiocresol, 2,3,5,6-tetrafluorothiophenol, cyclohexyl mercaptan, methylthioglycolate, mercapto pyridines, dithioerythritol, 6-ethoxy-2-mercaptobenzothiazole, d-limonene dimercaptan, and mixtures thereof. The thiol is included in an amount such that the thiol to catalyst molar ratio is >2:1 to 500:1.

The composition of the invention may be used in a process to produce a three-dimensional object, the process involving the steps of A) depositing the composition according to the invention atop a carrier to obtain a layer of a construction material joined to the carrier which corresponds to a first selected cross section of the precursor; B) depositing additional composition atop a previously applied layer of the construction material to obtain a further layer of the construction material which corresponds to a further selected cross section of the precursor and which is joined to the previously applied layer, C) repeating step B) until the precursor is formed, wherein the depositing of the composition at least in step B) comprises introducing energy to a selected region of the composition corresponding to the respectively selected cross section of the object. A further step may include thermally curing the composition by heating it to 120 C° for 30 minutes.

In the 3D printing process according to the invention, the object is thus obtained in a production phase which may also be called a construction phase. This construction phase may be realized by means of ray-optic additive manufacturing processes such as stereolithography or the digital light processing (DLP) process or by inkjet printing processes combined with radiative crosslinking and forms the subject matter of the steps A), B) and C). In the context of the present invention, the material from which the precursor is obtained in the additive manufacturing process is referred to herein as "construction material". Step A) of the process involves depositing the composition atop a carrier. This is usually the first step in stereolithography and DLP processes. In this way, a layer of a construction material joined to the carrier which corresponds to a first selected cross section of the precursor is obtained.

Step B) comprises repeatedly depositing additional inventive composition atop a previously applied layer of the construction material to obtain a further layer of the construction material which corresponds to a further selected cross section of the precursor and which is joined to the previously applied layer. The previously applied layer of the construction material may be the first layer from step A) or a layer from a previous run of step B). Also in accordance with the invention, the depositing of the inventive composition at least in step B) (preferably also in step A) comprises exposure and/or irradiation of a selected region of the composition corresponding to the respectively selected cross section of the object. The composition is converted into the crosslinked resin by exposure and/or irradiation which triggers free-radical crosslinking reactions. "Exposure" as used herein means introduction of light in the range between near-IR and near-UV light (wavelengths of 1400 nm to 315 nm). The remaining shorter wavelength ranges are covered by the term "irradiation", for example, far UV light, x-ray radiation, gamma radiation and electron radiation. The selection of the respective cross section may be accomplished by use of a CAD program, with which a model of the object to be produced has been generated. This operation is also known as "slicing" and serves as a basis for controlling the exposure and/or irradiation of the composition.

A variety of different 3D printing processes for forming objects are known to those skilled in art, such as those described in U.S. Pat. Nos. 9,453,142; and 10,793,745; and in U.S. Pat. Pub. 2021/0054125. These and other processes not mentioned here may use the inventive composition to produce objects.

EXAMPLES

The non-limiting and non-exhaustive examples that follow are intended to further describe various non-limiting and non-exhaustive embodiments without restricting the scope of the embodiments described in this specification. All quantities given in "parts" and "percents" are understood to be by weight, unless otherwise indicated.

| | |
|---|---|
| POLYISO A | 3-isocyanatomethyl-3,5,5-trimethylcyclohexyl-isocyanate having an NCO group content of about 37.8%; |
| POLYISO B | an aliphatic polyisocyanate based on hexamethylene diisocyanate having an NCO group content of about 19.5%; |
| POLYISO C | linear NCO prepolymer based on hexamethylene diisocyanate having an NCO group content of about 12.5%; |
| POLYOL A | a linear, hydroxyl-terminated, aliphatic polycarbonate polyester diol with a molecular weight of 988.5 g/mol, an OH number of 113.5 mg KOH/g; |
| POLYOL B | poly(tetramethylene ether)glycol with a molecular weight of 269 g/mol, an OH number of 417.1 mg KOH/g, commercially available from Sigma-Aldrich; |
| POLYOL C | Isosorbide diol extended with propylene glycol with a molecular weight of 303.2 g/mol, an OH number of 370.1 mg KOH/g, synthesized following the procedure in US20200291260A1 |

-continued

| POLYOL D | 1,4-butane diol, commercially available from Sigma-Aldrich; |
| CATALYST A | dibutyltin dilaurate, commercially available from Air Products as DABCO T-12; |
| ACRYLATE A | 2-hydroxyalkyl methacrylate (HEMA), commercially available from Sigma-Aldrich; |
| REACTIVE DILUENT A | isobornyl methacrylate (IBOMA), commercially available from Sigma-Aldrich; |
| PI A (photoinitiator A) | 2-hydroxy-2-methyl-1-phenylpropanone, commercially available from IGM Resins as OMNIRAD 1173; |
| STABILIZER A | phenothiozine commercially available from Sigma-Aldrich; |
| STABILIZER B | butylated hydroxytoluene commercially available from Sigma-Aldrich |
| SOLVENT A | ethyl acetate; and |
| THIOL A | glycol di(3-mercaptopropionate), commercially available from BRUNO BOCK. |

Sample Preparation

Solid polyol samples were heated in an oven at 60° C. overnight before use. A 10 wt. % CATALYST A solution in SOLVENT A, a 10 wt % STABILIZER A solution in SOLVENT A, and a 5 wt. % BHT solution in SOLVENT A were prepared for use in prepolymer synthesis. At room temperature, the POLYOL according to Table I was mixed in SOLVENT A until it formed a homogeneous solution in a three-neck reactor fitted with a reflex condenser, a thermocouple, and mechanical stirrer. CATALYST A (100 ppm) was added into the mixture. The stirring rate was set at 500 rpm and reaction was blanketed with nitrogen. The temperature was increased to 60° C., and POLYISO A was added dropwise into the reactor within approximately 15 min. A dry ice bath was used to cool the reactor to keep the solution temperature lower than 70° C. After one hour, the NCO content was titrated against the NCO target in the first step prior to adding ACRYLATE A. If the NCO content was not at the target, the reaction was continued for an additional 30 minutes until reaching the target. STABILIZER A (50 ppm) and optionally additional CATALYST A (400 ppm) were added into the reactor. ACRYLATE A was added into the solution within 15 min. The NCO content was titrated after 60 min. and the reaction was stopped after the NCO content was less than 0.2 wt. %. Finally, the reaction was cooled to room temperature. The NCO was titrated and STABILIZER B (100 ppm) was added to the solution. The content of SOLVENT A in the prepolymer is 25.0 wt. %. Details of the three prepolymers so made are summarized in Table I.

TABLE I

| URETHANE PREPOLYMER | POLYOL | NCO/OH index | Theoretical MW (g/mol) |
| --- | --- | --- | --- |
| A | B | 1.25 | 2444 |
| B | A | 2.00 | 1738 |
| C | C | 1.50 | 1439 |

Film Preparation and Evaluation

The prepolymers listed in Table I, synthesized in SOLVENT A at 75 wt % were mixed with the reactive diluent as detailed in Tables II, IV and VII along with PI A (3 wt % based on prepolymer solid) using a speed mixer, cast into 400 μm wet films and cured using a LIBERTY CONVEYOR UV oven. UV cure conditions were 200 W/in 105 amps: 14 fpm (1530 mJ/cm$^2$) double pass; post thermal cure after drying under ambient conditions at 80, 100, and 125° C. for 30 min. each. Viscosity data is presented in Table VI for samples made with URETHANE PREPOLYMER B.

Film samples were cut into dog-bone shaped samples using a Type C die. The tensile tests were measured according to ASTM D412 at 23° C. under 50% relative humidity. An INSTRON 5900R testing machine was used with 10 kN load cell. The pull speed was 50 mm/min. Nominal tensile properties are reported in Tables III, V, and VIII.

TABLE II

| Sample | Component A | Wt. A (g) | THIOL A (g) | Component B | Wt. B (g) | Ratio *** |
| --- | --- | --- | --- | --- | --- | --- |
| A-1 | POLYOL C/ | 0 | 0.25 | URETHANE | 20 | 3.6 |
| A-2 | POLYISO B | 3 | 0.21 | PREPOLYMER | 17 | 3.5 |
| A-3 | (1:1.5 by wt.) | 6 | 0.18 | A*/REACTIVE DILUENT A (7:3 by wt.) containing 3% PI A | 14 | 3.7 |
| A-4 comparative | POLYOL C/ POLYISO B (1:1.5 by wt.)** | 20 | — | — | — | — |

*URETHANE PREPOLYMER weight excluded solvent weight. URETHANE PREPOLYMER contained 500 ppm CATALYST A
**cured with 100 ppm CATALYST A
*** weight ratio of THIOL A to CATALYST A

TABLE III

| Sample | Modulus (MPa) | Strength at break (MPa) | Yield stress (MPa) | Elongation at break (%) | Yield elongation (%) |
| --- | --- | --- | --- | --- | --- |
| A-1 | 2290 | 30 | 47.7 | 16.1 | 3.6 |
| A-2 | 1365 | 33.4 | 26.5 | 91.2 | 4.6 |
| A-3 | 724 | 27.8 | 13.9 | 120.2 | 6.1 |
| A-4 | — | 18.3 | — | 167 | — |

TABLE IV

| Sample | Component A | Wt. A (g) | THIOL A (g) | Component B | Wt. B (g) | Ratio ** |
| --- | --- | --- | --- | --- | --- | --- |
| B-1 | POLYOL C/ | 0 | 0.2 | URETHANE | 30 | 13.3 |
| B-2 | POLYISO B | 11.5 | 0.1 | PREPOLYMER B*/ | 30 | 6.7 |
| B-3 | (1:1.5 by wt.) | 11.5 | 0.2 | REACTIVE DILUENT A (1:1 by wt.) containing 3% PI A | 30 | 13.3 |

*URETHANE PREPOLYMER weight excluded solvent weight. URETHANE PREPOLYMER contained 100 ppm CATALYST A
** weight ratio of THIOL A to CATALYST A

TABLE V

| Sample | Tensile modulus (MPa) | Tensile stress at break (MPa) | Yield stress (MPa) | Elongation at break (%) | Yield elongation (%) |
|--------|------------------------|-------------------------------|---------------------|--------------------------|----------------------|
| B-1 | 2076 | 33.7 | 45.1 | 6.3 | 3.6 |
| B-2 | 738 | 21 | 15.2 | 90.2 | 5.4 |
| B-3 | 686 | 21.6 | 13.9 | 96.4 | 5.2 |

TABLE VI

| | T < 10 min | 2 hours | 24 hours |
|--------|------------|---------|----------|
| B-2 | 451 | 463 | 904 |
| B-3 | 450 | 478 | 848 |

TABLE VII

| Sample | Component A | Wt. A (g) | THIOL A (g) | Component B | Wt. B (g) | Ratio *** |
|--------|-------------|-----------|-------------|-------------|-----------|-----------|
| C-1 | POLYOL D/ | 0 | 0.6 | URETHANE | 20 | 6.0 |
| C-2 | POLYISO C | 8 | 0.5 | PREPOLYMER C* | 12 | 8.3 |
| C-3 | (1:7.52 by wt.) | 10 | 0.3 | containing 3% PI A | 10 | 6.0 |
| C-4 comparative | POLYOL D/ POLYISO C (1:7.52 by wt.)** | 20 | — | — | — | — |

*URETHANE PREPOLYMER weight excluded solvent weight. URETHANE PREPOLYMER contained 500 ppm CATALYST A
**cured with 100 ppm CATALYST A
*** weight ratio of THIOL A to CATALYST A

TABLE VIII

| Sample | Modulus (MPa) | Strength at Break (MPa) | Yield Stress (MPa) | Elongation at Break (%) | Yield Elongation (%) |
|--------|---------------|--------------------------|---------------------|--------------------------|----------------------|
| C-1 | Brittle | — | — | — | — |
| C-2 | 1653 | 35.3 | 40.4 | 28.4 | 4.4 |
| C-3 | 1193 | 56.4 | 28.8 | 109.9 | 5.1 |
| C-4 | 160 | 60 | — | 420 | — |

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. § 112(a), and 35 U.S.C. § 132(a).

Various aspects of the subject matter described herein are set out in the following numbered clauses:

Clause 1. A composition comprising: A) an aliphatic polyurethane which comprises a reaction product of a first aliphatic polyisocyanate, a first polyol, and a thiol, optionally in the presence of a catalyst, and B) a urethane (meth)acrylate prepolymer, optionally a reactive diluent, and a photoinitiator, wherein the urethane (meth)acrylate prepolymer comprises a reaction product of a second aliphatic polyisocyanate, a second polyol and an acrylate, wherein the reactive diluent comprises a (meth)acrylate monomer, wherein the first aliphatic polyisocyanate and second aliphatic polyisocyanate may be identical or different, and wherein the first polyol and the second polyol may be identical or different.

Clause 2. The composition according to Clause 1, wherein the first aliphatic polyisocyanate and the second aliphatic polyisocyanate are each independently selected from the group consisting of 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanato-methyl cyclopentane, 5-isocyanato-1-(isocyanatomethyl)-1,3,3-trimethylcyclohexane, bis-(4-isocyanatocyclohexyl)methane, 1,3-bis(isocyanatomethyl)-cyclohexane, 1,4-bis(isocyanatomethyl)-cyclohexane, bis-(4-isocyanato-3-methyl-cyclohexyl)-methane, 1-isocyanato-1-methyl-4(3)-isocyanatomethyl cyclohexane, dicyclohexylmethane-4,4-diisocyanate, pentane diisocyanate, trimers of any of these, prepolymers of any of these, isomers of any of these, allophanates of any of these, and combinations of any of these.

Clause 3. The composition according to one of Clauses 1 and 2, wherein the first polyol and the second polyol are each independently selected from the group consisting of acrylic polyols, polyester polyols, polyether polyols, polyurethane polyols, and polycarbonate polyols.

Clause 4. The composition according to any one of Clauses 1 to 3, wherein the photoinitiator is selected from the group consisting of benzophenones in combination with tertiary amines, alkylbenzophenones, 4,4'-bis(dimethylamino)benzophenone, anthrone, halogenated benzophenones, benzoin, benzil ketals, acylphosphine oxides, 2,4,6-trimethylbenzoyldiphenylphosphine oxide, bisacylphosphine oxides, phenylglyoxylic esters, camphorquinone, α-aminoalkylphenones, α,α-dialkoxyacetophenones and α-hydroxyalkylphenones, phenylbis(2,4,6-trimethylbenzoyl)phosphine oxide, oligo-[2-hydroxy-2-methyl-1-[4-(1-methylvinyl)phenyl]propanones, bis(4-methoxybenzoyl)diethylgermanium, and combinations thereof.

Clause 5. The composition according to any one of Clauses 1 to 4, wherein the first aliphatic polyurethane comprises 10 wt. % to 50 wt. % of the composition, wherein wt. % is based on the weight of the composition.

Clause 6. The composition according to any one of Clauses 1 to 5, wherein the reactive diluent is selected from the group consisting of phenoxy ethyl(meth)acrylate, phenoxy-2-methylethyl(meth)acrylate, phenoxyethoxyethyl(meth)acrylate, 3-hydroxy-2-hydroxypropyl(meth)acrylate, benzyl(meth)acrylate, phenylthio ethyl acrylate, 2-naphthylthio ethyl acrylate, 1-naphthylthio ethyl acrylate, 2,4,6-tribromophenoxy ethyl acrylate, 2,4-dibromophenoxy ethyl acrylate, 2-bromophenoxy ethyl acrylate, 1-naphthyloxy ethyl acrylate, 2-naphthyloxy ethyl acrylate, phenoxy 2-methylethyl acrylate, phenoxyethoxyethyl acrylate, 3-phenoxy-2-hydroxy propyl acrylate, 2,4-dibromo-6-sec-butylphenyl acrylate, 2,4-dibromo-6-isopropylphenyl (meth)acrylate, benzyl (meth)acrylate, phenyl (meth)acrylate, tetrahydrofurfuryl (meth)acrylate, alkoxylated tetrahydrofurfuryl acrylate, ethoxylated nonyl phenol (meth)acrylate, alkoxylated lauryl (meth)acrylate, alkoxylated phenol (meth)acrylate, stearyl (meth)acrylate, tetrahydrofurfuryl (meth)acrylate, lauryl (meth)acrylate, isodecyl (meth)acrylate, isooctyl (meth)acrylate, octadecyl (meth)acrylate, tridecyl (meth)acrylate, ethoxylated (4) nonyl phenol (meth)acrylate, caprolactone (meth)acrylate, cyclic trimethylolpropane formal (meth)acrylate, 3,3,5-trimethylcyclohexyl (meth)acrylate, dicyclopentadienyl (meth)acrylate, isobutyl (meth)acrylate, n-butyl (meth)acrylate, ethyl hexyl (meth)acrylate, isobornyl (meth)acrylate, and 2,4,6-tribromophenyl (meth)acrylate.

Clause 7. The composition according to any one of Clauses 1 to 6, wherein the thiol is selected from the group consisting of trimethylol propane tri-(3-mercapto propionate), pentaerythritol tetra-(3-mercapto propionate), glycol di-(3-mercapto propionate), glycol dimercapto acetate, trimethylol propane trithioglycolate, mercapto diethyl ether, ethane dithiol, thiolactic acid, mercapto propionic acid and esters thereof, thiophenol, thio acetic acid, 2-mercapto ethanol, 1,4-butanedithiol, 2-3-dimercapto propanol, toluene-3,4-dithiol, α,α'-dimercapto-p-xylene, thiosalicylic acid, mercapto acetic acid, dodecane dithiol, didodecane dithiol, di-thio phenol, di-p-chlorothiophenol, dimercapto benzothiazole, 3,4-dimercapto toluene, allyl mercaptan, benzyl mercaptan, 1,6-hexane dithiol, 1-octane thiol, p-thiocresol, 2,3,5,6-tetrafluorothiophenol, cyclohexyl mercaptan, methylthioglycolate, mercapto pyridines, dithioerythritol, 6-ethoxy-2-mercaptobenzothiazole, d-limonene dimercaptan, and mixtures thereof.

Clause 8. The composition according to any one of Clauses 1 to 7, wherein the thiol is included in a molar ratio to the catalyst of >2:1 to 500:1.

Clause 9. A process comprising combining: A) a polyurethane which comprises a reaction product of a first aliphatic polyisocyanate, a first polyol, and a thiol, optionally in the presence of a catalyst, and B) a urethane (meth)acrylate prepolymer, a reactive diluent, and a photoinitiator, wherein the urethane (meth)acrylate prepolymer comprises a reaction product of a second aliphatic polyisocyanate, a second polyol and an acrylate, wherein the reactive diluent comprises a (meth)acrylate monomer, wherein the first aliphatic polyisocyanate and second aliphatic polyisocyanate may be identical or different, and wherein the first polyol and the second polyol may be identical or different.

Clause 10. The process according to Clause 9, wherein the first aliphatic polyisocyanate and the second aliphatic polyisocyanate are independently selected from the group consisting of 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanato-methyl cyclopentane, 5-isocyanato-1-(isocyanatom-ethyl)-1,3,3-trimethylcyclohexane, bis-(4-isocyan-atocyclohexyl)methane, 1,3-bis(isocyanatomethyl)-cyclohexane, 1,4-bis(isocyanatomethyl)-cyclohexane, bis-(4-isocyanato-3-methyl-cyclohexyl)-methane, 1-isocyanato-1-methyl-4(3)-isocyanato-methyl cyclohexane, dicyclohexylmethane-4,4-diisocyanate, pentane diisocyanate, trimers of any of these, prepolymers of any of these, isomers of any of these, allophanates of any of these, and combinations of any of these.

Clause 11. The process according to one of Clauses 9 and 10, wherein the first polyol and the second polyol are independently selected from the group consisting of acrylic polyols, polyester polyols, polyether polyols, polyurethane polyols, and polycarbonate polyols.

Clause 12. The process according to any one of Clause 9 to 11, wherein the photoinitiator is selected from the group consisting of benzophenones in combination with tertiary amines, alkylbenzophenones, 4,4'-bis(dimethylamino)benzophenone, anthrone, halogenated benzophenones, benzoin, benzil ketals, acylphosphine oxides, 2,4,6-trimethylbenzoyldiphenylphosphine oxide, bisacylphosphine oxides, phenylglyoxylic esters, camphorquinone, α-aminoalkylphenones, α,α-dialkoxyacetophenones and α-hydroxyalkylphenones, phenylbis(2,4,6-trimethylbenzoyl)phosphine oxide, oligo-[2-hydroxy-2-methyl-1-[4-(1-methylvinyl)phenyl]propanones, bis(4-methoxybenzoyl)diethylgerma-nium, and combinations thereof.

Clause 13. The process according to any one of Clauses 9 to 12, wherein the first aliphatic polyurethane comprises 10 wt. % to 50 wt. % of the composition, wherein wt. % is based on the weight of the composition.

Clause 14. The process according to any one of Clauses 9 to 13, wherein the reactive diluent is selected from the group consisting of phenoxy ethyl(meth)acrylate, phenoxy-2-methylethyl(meth)acrylate, phenoxyethoxyethyl(meth)acrylate, 3-hydroxy-2-hydroxypropyl(meth)acrylate, benzyl(meth)acrylate, phenylthio ethyl acrylate, 2-naphthylthio ethyl acrylate, 1-naphthylthio ethyl acrylate, 2,4,6-tribromophenoxy ethyl acrylate, 2,4-dibromophenoxy ethyl acrylate, 2-bromophenoxy ethyl acrylate, 1-naphthyloxy ethyl acrylate, 2-naphthyloxy ethyl acrylate, phenoxy 2-methylethyl acrylate, phenoxyethoxyethyl acrylate, 3-phenoxy-2-hydroxy propyl acrylate, 2,4-dibromo-6-sec-butylphenyl acrylate, 2,4-dibromo-6-isopropylphenyl (meth)acrylate, benzyl (meth)acrylate, phenyl (meth)acrylate, tetrahydrofurfuryl (meth)acrylate, alkoxylated tetrahydrofurfuryl acrylate, ethoxylated nonyl phenol (meth)acrylate, alkoxylated lauryl (meth)acrylate, alkoxylated phenol (meth)acrylate, stearyl (meth)acrylate, tetrahydrofurfuryl (meth)acrylate, lauryl (meth)acrylate, isodecyl (meth)acrylate, isooctyl (meth)acrylate, octadecyl (meth)acrylate, tridecyl (meth)acrylate, ethoxylated (4) nonyl phenol (meth)acrylate, caprolactone (meth)acrylate, cyclic trimethylolpropane formal (meth)acrylate, 3,3,5-trimethylcyclohexyl (meth)acrylate, dicyclopentadienyl (meth)acrylate, isobutyl (meth)acrylate, n-butyl (meth)acrylate, ethyl hexyl (meth)acrylate, isobornyl (meth)acrylate, and 2,4,6-tribromophenyl (meth)acrylate.

Clause 15. The process according to any one of Clauses 9 to 14, wherein the thiol is selected from the group consisting of trimethylol propane tri-(3-mercapto propionate), pentaerythritol tetra-(3-mercapto propionate), glycol di-(3-mercapto propionate), glycol dimercapto acetate, trimethylol propane trithioglycolate, mercapto diethyl ether, ethane dithiol, thiolactic acid, mercapto propionic acid and esters thereof, thiophenol, thio acetic acid, 2-mercapto ethanol, 1,4-butanedithiol, 2-3-dimercapto propanol, toluene-3, 4-dithiol, α,α'-dimercapto-p-xylene, thiosalicylic acid, mercapto acetic acid, dodecane dithiol, didodecane dithiol, di-thio phenol, di-p-chlorothiophenol, dimercapto benzothiazole, 3,4-dimercapto toluene, allyl mercaptan, benzyl mercaptan, 1,6-hexane dithiol, 1-octane thiol, p-thiocresol, 2,3, 5,6-tetrafluorothiophenol, cyclohexyl mercaptan, methylthioglycolate, mercapto pyridines, dithioerythritol, 6-ethoxy-2-mercaptobenzothiazole, d-limonene dimercaptan, and mixtures thereof.

Clause 16. The process according to any one of Clauses 9 to 15, wherein the thiol is included in a molar ratio to the catalyst of >2:1 to 500:1.

Clause 17. A process of producing a three-dimensional object, the process comprising the steps of: A) depositing the composition according to any one of Clauses 1 to 8 atop a carrier to obtain a layer of a construction material joined to the carrier which corresponds to a first selected cross section of the precursor; B) depositing additional composition atop a previously applied layer of the construction material to obtain a further layer of the construction material which corresponds to a further selected cross section of the precursor and which is joined to the previously applied layer; C) repeating step B) until the precursor is formed, wherein the depositing of the composition at least in step B) further comprises introducing energy to a selected region of the composition corresponding to the respectively selected cross section of the object.

Clause 18. The process according to Clause 17, wherein in step B) a plurality of energy beams simultaneously exposes and/or irradiates the selected region of the layer of the composition corresponding to the respectively selected cross section of the object.

Clause 19. The process according to Clause 18, wherein step B) further includes heating the composition to 120 C°.

What is claimed is:

1. A composition comprising:

A) an aliphatic polyurethane which comprises a reaction product, formed by a thermal curing process, of a first aliphatic polyisocyanate, a first polyol, and a thiol, optionally in the presence of a catalyst, and B) a urethane (meth) acrylate prepolymer, optionally a reactive diluent, and a photoinitiator, which upon a UV curing process prior to the thermal curing process forms UV-cured urethane (meth) acrylate, wherein the urethane (meth) acrylate prepolymer comprises a reaction product of a second aliphatic polyisocyanate, a second polyol and an acrylate, wherein the reactive diluent comprises a (meth) acrylate monomer, wherein the first aliphatic polyisocyanate and second aliphatic polyisocyanate may be identical or different, and wherein the first polyol and the second polyol may be identical or different.

2. The composition according to claim 1, wherein the first aliphatic polyisocyanate and the second aliphatic polyisocyanate are each independently selected from the group consisting of 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanato-methyl cyclopentane, 5-isocyanato-1-(isocyanatomethyl) -1,3,3-trimethylcyclohexane, bis-(4-isocyanatocyclohexyl) methane, 1,3-bis (isocyanatomethyl)-cyclohexane, 1,4-bis (isocyanatomethyl)-cyclohexane, bis-(4-isocyanato- 3-methyl-cyclohexyl)-methane, 1-isocyanato-1-methyl-4 (3)-isocyanato-methyl cyclohexane,dicyclohexylmethane-4,4-diisocyanate, pentane diisocyanate, trimers of any of these, prepolymers of any of these, isomers of any of these, allophanates of any of these, and combinations of any of these.

3. The composition according to claim 1, wherein the first polyol and the second polyol are each independently selected from the group consisting of acrylic polyols, polyester polyols, polyether polyols, polyurethane polyols, and polycarbonate polyols.

4. The composition according to claim 1, wherein the photoinitiator is selected from the group consisting of benzophenones in combination with tertiary amines, alkylbenzophenones, 4,4'-bis (dimethylamino) benzophenone, anthrone, halogenated benzophenones, benzoin, benzil ketals, acylphosphine oxides, 2,4,6-trimethylbenzoyldiphenylphosphine oxide, bisacylphosphine oxides, phenylglyoxylic esters, camphorquinone, a-aminoalkylphenones, α,α-dialkoxyacetophenones and a-hydroxyalkylphenones, phenylbis (2,4,6-trimethylbenzoyl) phosphine oxide, oligo-[2-hydroxy-2-methyl-1-[4-(1-methylvinyl) phenyl] propanones, bis (4-methoxybenzoyl) diethylgermanium, and combinations thereof.

5. The composition according to claim 1, wherein the first aliphatic polyurethane comprises 10 wt. % to 50 wt. % of the composition, wherein wt. % is based on the weight of the composition.

6. The composition according to claim 1, wherein the reactive diluent is selected from the group consisting of phenoxy ethyl (meth) acrylate, phenoxy-2-methylethyl (meth) acrylate, phenoxyethoxyethyl (meth) acrylate, 3-hydroxy-2- hydroxypropyl (meth) acrylate, benzyl (meth) acrylate, phenylthio ethyl acrylate, 2-naphthylthio ethyl acrylate, 1-naphthylthio ethyl acrylate, 2,4,6-tribromophenoxy ethyl acrylate, 2,4-dibromophenoxy ethyl acrylate, 2-bromophenoxy ethyl acrylate, 1-naphthyloxy ethyl acrylate, 2-naphthyloxy ethyl acrylate, phenoxy 2-methylethyl acrylate, phenoxyethoxyethyl acrylate, 3-phenoxy-2-hydroxy propyl acrylate, 2,4-dibromo-6-sec-butylphenyl acrylate, 2,4-dibromo-6-isopropylphenyl (meth) acrylate, benzyl (meth) acrylate, phenyl (meth) acrylate, tetrahydrofurfuryl (meth) acrylate, alkoxylated tetrahydrofurfuryl acrylate, ethoxylated nonyl phenol (meth) acrylate, alkoxylated lauryl (meth) acrylate, alkoxylated phenol (meth) acrylate, stearyl (meth) acrylate, tetrahydrofurfuryl (meth) acrylate, lauryl (meth) acrylate, isodecyl (meth) acrylate, isooctyl (meth) acrylate, octadecyl (meth) acrylate, tridecyl (meth) acrylate, ethoxylated (4) nonyl phenol (meth) acrylate, caprolactone (meth) acrylate, cyclic trimethylolpropane formal (meth) acrylate, 3,3,5-trimethylcyclohexyl (meth) acrylate, dicyclopentadienyl (meth) acrylate, isobutyl (meth) acrylate, n-butyl (meth) acrylate, ethyl hexyl (meth) acrylate, isobornyl (meth) acrylate, and 2,4,6-tribromophenyl (meth) acrylate.

7. The composition according to claim 1, wherein the thiol is selected from the group consisting of trimethylol propane tri-(3-mercapto propionate), pentaerythritol tetra-(3-mercapto propionate), glycol di-(3-mercapto propionate), glycol dimercapto acetate, trimethylol propane trithioglycolate, mercapto diethyl ether, ethane dithiol, thiolactic acid, mercapto propionic acid and esters thereof, thiophenol, thio acetic acid, 2-mercapto ethanol, 1,4-butanedithiol, 2-3-dimercapto propanol, toluene-3,4-dithiol, $\alpha$, $\alpha'$-dimercapto-p-xylene, thiosalicylic acid, mercapto acetic acid, dodecane dithiol, didodecane dithiol, di-thio phenol, di-p-chlorothiophenol, dimercapto benzothiazole, 3,4-dimercapto toluene, allyl mercaptan, benzyl mercaptan, 1,6-hexane dithiol, 1-octane thiol, p-thiocresol, 2,3,5,6-tetrafluorothiophenol, cyclohexyl mercaptan, methylthioglycolate, mercapto pyridines, dithioerythritol, 6-ethoxy-2-mercaptobenzothiazole, d-limonene dimercaptan, and mixtures thereof.

8. The composition according to claim 1, wherein the thiol is included in a molar ratio to the catalyst of >2:1 to 500:1.

\* \* \* \* \*